(12) United States Patent
Fontaine et al.

(10) Patent No.: US 11,514,651 B2
(45) Date of Patent: Nov. 29, 2022

(54) UTILIZING AUGMENTED REALITY TO VIRTUALLY TRACE CABLES

(71) Applicant: EXFO Inc., Quebec (CA)

(72) Inventors: Jean Fontaine, Laval (CA); Vinay Mandy, Montreal (CA)

(73) Assignee: EXFO Inc., Québec (CA)

( * ) Notice: Subject to any disclaimer, the term of this patent is extended or adjusted under 35 U.S.C. 154(b) by 0 days.

(21) Appl. No.: 17/337,648

(22) Filed: Jun. 3, 2021

(65) Prior Publication Data
US 2021/0398355 A1 Dec. 23, 2021

Related U.S. Application Data

(60) Provisional application No. 63/041,190, filed on Jun. 19, 2020.

(51) Int. Cl.
*G06T 19/00* (2011.01)
*G06T 15/20* (2011.01)
*G06N 20/00* (2019.01)
*G06T 19/20* (2011.01)

(52) U.S. Cl.
CPC .......... *G06T 19/006* (2013.01); *G06N 20/00* (2019.01); *G06T 15/205* (2013.01); *G06T 19/20* (2013.01); *G06T 2215/16* (2013.01); *G06T 2219/2012* (2013.01)

(58) Field of Classification Search
None
See application file for complete search history.

(56) References Cited

U.S. PATENT DOCUMENTS

| 2013/0114100 A1* | 5/2013 | Torii | H04N 1/00344 |
| | | | 358/1.14 |
| 2015/0059002 A1* | 2/2015 | Balram | G06F 1/163 |
| | | | 726/28 |
| 2016/0134484 A1* | 5/2016 | Tanaka | H04L 41/12 |
| | | | 345/633 |

(Continued)

FOREIGN PATENT DOCUMENTS

WO 2018/065731 A1 4/2018

OTHER PUBLICATIONS

Weiming Hu, Tieniu Tan, Liang Wang, and Steve Maybank, "A Survey on Visual Surveillance of Object Motion and Behaviors," 2004, IEEE Transactions on Systems, Man and Cybernetics—Part C Applications and Reviews 34(3):334-352 (Year: 2004).*

(Continued)

*Primary Examiner* — Michael J Cobb
(74) *Attorney, Agent, or Firm* — Clements Bernard Baratta; Lawrence A. Baratta, Jr.

(57) ABSTRACT

Systems and methods for utilizing Augmented Reality (AR) processes to track cables among a tangled bundle of cables are provided. An AR method, according to one implementation, includes a step of obtaining an initial captured image showing a bundle of cables. The AR method also includes the step of processing the initial captured image to distinguish a selected cable from other cables of the bundle of cables. Also, the AR method includes displaying the initial captured image on a display screen while visually augmenting an image of the selected cable to highlight the selected cable with respect to the other cables.

20 Claims, 12 Drawing Sheets

(56) References Cited

U.S. PATENT DOCUMENTS

| | | | | |
|---|---|---|---|---|
| 2016/0140868 | A1* | 5/2016 | Lovett | G06T 19/006 434/118 |
| 2018/0077200 | A1* | 3/2018 | Apvrille | H04L 63/1416 |
| 2019/0041637 | A1* | 2/2019 | German | G06K 7/10722 |
| 2019/0128676 | A1* | 5/2019 | Naik | G06T 7/248 |
| 2019/0197791 | A1 | 6/2019 | Skidmore | |
| 2019/0341722 | A1* | 11/2019 | Werner | G06T 19/006 |
| 2019/0371060 | A1* | 12/2019 | Energin | G06T 17/05 |
| 2020/0184653 | A1* | 6/2020 | Faulkner | G06F 3/011 |
| 2020/0311647 | A1* | 10/2020 | Seshadri | G06Q 10/06398 |
| 2020/0372253 | A1* | 11/2020 | Jain | G06V 10/225 |
| 2021/0004076 | A1* | 1/2021 | Schweet | G06F 3/017 |
| 2021/0125407 | A1* | 4/2021 | Pekelny | G06T 19/20 |
| 2021/0276675 | A1* | 9/2021 | Okvist | B63C 9/01 |
| 2021/0286923 | A1* | 9/2021 | Kristensen | G01S 7/412 |

OTHER PUBLICATIONS

Lianyu Zheng, Xinyuliu Liu, Zewu An, Shufei Li, Renjie Zhang, "A Smart Assistance System for Cable Assembly by Combining Wearable Augmented Reality with Portable Visual Inspection," 2020, Virtual Reality and Intelligent Hardware, 2(1):12-27 (Year: 2020).*

Gerhard Schall, Erick Mendez, Ernst Kruijff, Eduardo Veas, Sebastian Junghanns, Bernhard Reitinger, Dieter Schmalstieg, "Handheld Augmented Reality for Underground Infrastructure Visualization", 2009, Personal and Ubiquitous Computing, 13:281-291 (Year: 2009).*

Zheng et al., "A smart assistance system for cable assembly by combining wearable augmented reality with portable Visual inspection," Virtual Reality & Intelligent Hardware, 2020, vol. 2, Issue 1: 12-27, pp. 1-16.

Ar:met, ar:assist, Documentation, On top of reality, ar.assist-doku-v1.2_en.docx, pp. 1-6.

Ar:met, ar:guidance, Services, On top of reality, pp. 1-4.

Ar:met, ar:guidance—ar:met, https://www.armet.at/ar-guidance/, Jun. 16, 2020, pp. 1-2.

H. Chen et al., IOP Publishing, "Augmented Reality Based Visualization Method for Spacecraft Cable Assembly Process," IOP Conference Series: Materials Science and Engineering, ACMME 2019, pp. 1-8.

Ismail, CMS WiRE, "8 Augmented Reality Companies Changing the Digital Workplace," https://www.cmswire.com/digital-workplace/8-augmented-reality-companies-changing-the-digital-workplace/, Oct. 3, 2018, pp. 1-3.

Kroc, "Augmented Reality Comes to the Workplace," https://www.shrm.org/hr-today/news/hr-magazine/1017/pages/augmented-reality-comes-to-the-workplace.aspx, Sep. 20, 2017, pp. 1-6.

Augmented RealiTease, "Augmented Reality Electric App—Augmented RealiTease," https://augmentedrealitease.com/ar_electric-augmented_reality-app.cfm, May 20, 2020, pp. 1-4.

Rice et al., "Augmented Wire Routing Navigation for Wire Asse," Mar. 28, 2015, pp. 1-4.

CommScope, "CommScope Shows Augmented Reality With Intelligence to Help Customers Solve Real-World Problems," Apr. 11, 2018, pp. 1-4.

Wikitude, "Image Recognition and Tracking: Augmented Reality Use Cases and How-to," https://www.wikitude.com/blog-image-recognition-and-tracking-augmented-reality-use-cases-and-how-to/, Jun. 12, 2019, pp. 1-9.

Ritchie et al., Immersive Virtual Reality "Immersive Virtual Reality as an Interactive Tool for Cable Harnesses Design," Nov. 7, 2002, pp. 1-6.

Index AR Solutions, "Mobile Apps as a Service," https://www.indexarsolutions.com/mobile-apps/, May 5, 2020, pp. 1-6.

Costlow, SAE International, "Wiring harnesses are opportunity for Augmented Reality," https://www.sae.org/news/2016/04/wiring-harnesses-are-opportunity-for-augmented-reality, Apr. 14, 2016, pp. 1-2.

* cited by examiner

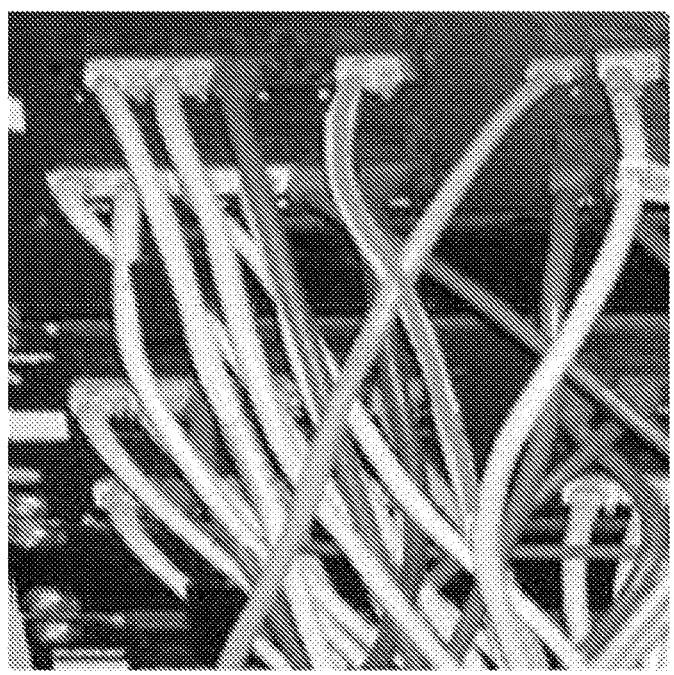
FIG. 4C
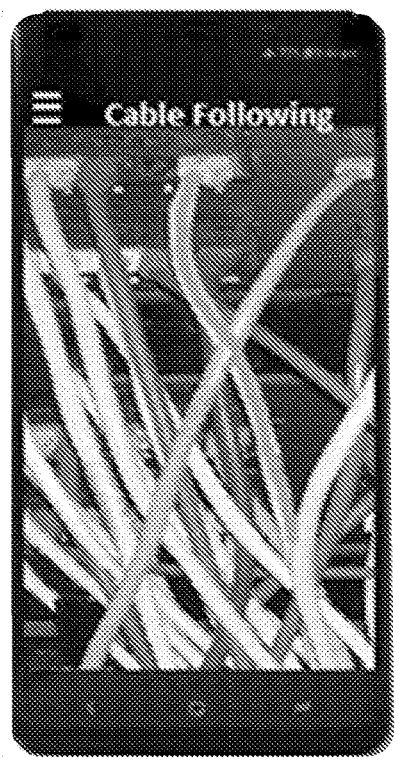 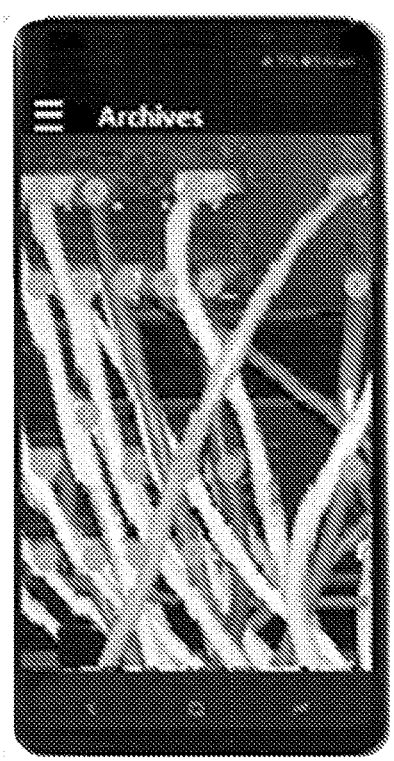
FIG. 4D    FIG. 4E

UTILIZING AUGMENTED REALITY TO VIRTUALLY TRACE CABLES

TECHNICAL FIELD

The present disclosure generally relates to electrical and optical cables in a network. More particularly, the present disclosure relates to utilizing augmented reality to superpose visual features on an image of a selected cable to distinguish the selected cable from a bundle of cables.

BACKGROUND

In many telecommunications environments, it can be difficult to manage a large number of cables within a limited space. Since a typical telecommunication service provider may be capable of handle hundreds or thousands of customers with various configurations, offering various services to the customers may require thousands of cables among the network equipment.

As a result of connecting multiple cables to a confined rack or chassis of a data center, server room, or other network system location, some issues may arise. First, due to poor equipment installation or maintenance, the cables may be arranged in a disorderly, unorganized manner. This can create a tangled mess, which may be referred to colloquially as a "rat nest" or a "spaghetti" configuration. Over time, this tangled bundle of cables may cause costly maintenance issues.

Another issue with this disorganized cabling arrangement is that it may be difficult for network technicians to follow the path of a certain cable. For instance, if a technician wishes to observe the end connections of a cable or to replace a faulty cable, it can be difficult to follow the particular cable from one end to the other. Even with a clean cable organization, it can be difficult to confirm where a cable starts or ends only by looking at it. Correcting the above issues in these conventional systems requires maintenance downtime involving manual manipulation and specialized tools. The longer it takes for the technician to follow cables during this downtime, the greater the negative impact on customers.

Therefore, there is a need in the field of cable management systems to enable a technician to track cables more easily when a group of cables are bundled or tangled together in a limited space.

BRIEF SUMMARY

The present disclosure is directed to Augmented Reality (AR) systems, AR methods, portable devices with AR capabilities, smart phone applications, and non-transitory computer-readable media for performing AR processes to assist a user with a task of following or tracking the path of a selected cable arranged with a plurality of other cables. From an image of a bundle of cables displayed on a display screen of a user device, a user can select one of the cables that he or she wishes to track. The AR application is configured to use image processing functionality to determine which cable sections belong to the selected cable and which cable sections belong to other cables. Then, the AR application can add virtual image features to the displayed image to highlight or emphasize the selected cable so that the user does not lose focus on the selected cable. For example, even if the user blinks and loses track of the selected cable, the AR application is able to remain focused on the selected cable and continuously highlight the selected cable as the user moves the portable image-capture device along the length of the cables.

According to one implementation, an AR method may include a step of obtaining an initial captured image showing a bundle of cables. The AR method also includes processing the initial captured image to distinguish a selected cable from other cables of the bundle of cables. Also, the AR method includes the step of displaying the initial captured image on a display screen while visually augmenting an image of the selected cable to highlight the selected cable with respect to the other cables.

Additional embodiments of the AR systems and methods may be provided. For example, the AR method may further includes the steps of: a) receiving a next captured image, b) comparing the next captured image with a previous captured image, c) using a tracking technique to identify at least a section of the selected cable in the next captured image, d) distinguishing the selected cable shown in the next captured image from the other cables, e) updating the display screen to display the next captured image while visually augmenting a next image of the selected cable to highlight the selected cable with respect to the other cables, and f) repeating the receiving, comparing, using, distinguishing, and updating steps one or more times in a continuous manner until the user decides to stop the application. Also, the step of comparing the next captured image with the previous captured image may include determining differences between the next captured image the previous captured image when an image capture device captures the next captured image and previous captured image from different viewpoints or when the at least one cable of the bundle of cables is moved.

Furthermore, the step of processing the initial captured image may include one or more procedures selected from the group of procedures consisting of an object recognition procedure, a line-crossing analysis, a line representation analysis, a point detection procedure, a color filtering procedure, a Canny-edge detection procedure, a morphological procedure, a dilation operation, an erosion operation, a skeletonization procedure, and a corner deletion procedure. Processing the initial captured image may also include tracking paths of each cable of the bundle of cables in one or two directions. Processing the initial captured image may include mapping each cable of the bundle of cables in a three-dimensional map.

The step of obtaining the initial captured image may include receiving the initial captured image from a camera of a portable user device, whereby the display screen may be associated with the portable user device. The portable user device, for example, may be one of a smart phone, a tablet, eyewear, and a head-up display. The AR method can include the step of receiving a user input for identifying the selected cable of the bundle of cables.

The step of visually augmenting the image of the selected cable may include the step of superposing virtual image features on the image of the selected cable. Superposing virtual image features may include the step of adding color or animation features to the image of the selected cable. The step of visually augmenting the image of the selected cable may further include displaying one or more visual features for showing portions of the selected cable that are hidden from view. The AR method may further include the step of using machine learning to distinguish the selected cable from the other cables.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIGS. 4A-4E are images of cables and visual highlighting features related to the cable visualization step shown in FIG. 2, according to various embodiments.

DETAILED DESCRIPTION

Figure 1:
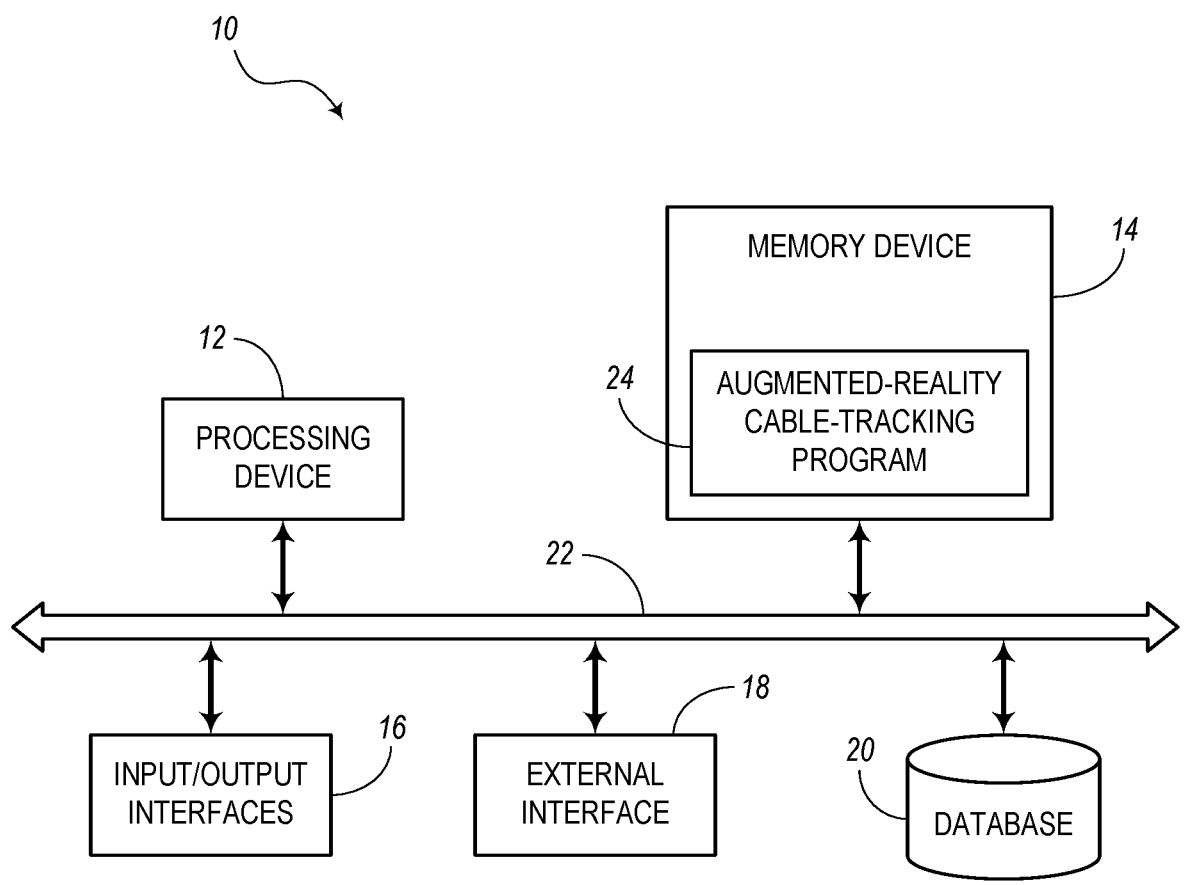
FIG. 1 is a block diagram illustrating a portable device for visually tracing a selected cable from a bundle of cables using augmented reality, according to various embodiments of the present disclosure.

The present disclosure relates to systems and methods for utilizing Augmented Reality (AR) to display real images while also providing additional virtual image features. More specifically, the systems and methods of the present disclosure are configured to allow a user to select a specific cable from a bundle of cables arranged in a small space (e.g., terminated at a back panel of rack-mounted network equipment deployed in a data center). Since cable bundles can often become a tangled mess, the present embodiments are configured to use image processing techniques or algorithms to analyze an image of the bundled cables and distinguish the selected cable from the other cables, regardless of which cables are in the foreground, in the background, hidden behind some cables, etc. For example, the systems and methods are able to determine a somewhat straight path of each path, which may be based on normal rigidity or bendability characteristics of cables. Once the image analysis processes of the present disclosure locate the selected cable and distinguish it from the other cables, the AR procedures may include the process of adding virtual image features (e.g., highlighted traces) superposed over the image of the selected cable. In this way, the user can more easily keep track of the selected cable.

AR is currently used in many applications, such as in manufacturing, maintenance, repair, warehouse operation, aircraft manufacturing involving the connection of multiple electrical components, etc. AR involves an interactive experience of a real-world environment, where a camera view of real-world objects is enhanced by computer-generated graphics overlaid on the real-world images. Different vendors have introduced various AR development platforms, making it possible for users of smart phones or tablets to access AR applications.

The present disclosure describes systems and methods to assist network technicians, cable installers, aircraft manufacturers, and other users who work in an environment where it may be necessary to handle or track multiple electrical, optical, electro-optical cables arranged in a small area. The AR systems and the methods assist the user with wiring predefined paths already provided by a formboard, and, in short, may be configured to graphically provide wiring assembly instructions. Presently, conventional AR systems do not allow a user to select a cable from a bunch of cables and use AR to highlight the selected cable on a display screen, as described in the present disclosure. Thus, the present disclosure provides AR systems and methods to help a worker to dynamically track the path of a selected cable among a "rat nest" of multiple cables, by virtually highlighting, on the user's display screen, the path of the selected cable.

The AR systems and methods may be associated with suitable applications that run on portable devices (e.g., smart phones, tablet computers, etc.). According to various embodiments of the present disclosure, the portable device may include an image capture device (e.g., camera, video camera, etc.) for capture an image or a series of images that can be processed by AR functionality as describe in the present disclosure to follow the path of the cables. Also, the portable device may include a display screen for showing the combination of real-world images captured by the image capture device plus virtually added or augmented image features on or with the real image.

The application utilizes AR to help a worker dynamically track the path of a selected cable among a bundle (also referred to as a "rat nest," "spaghetti," etc.) of multiple cables. The cable to be tracked is selected on the display screen by the worker and the AR processes are configured to graphically highlight this cable on the display screen. For example, the highlighting feature may include adding a color or animations on the live (real) image rendered by the portable device. The AR processes are also configured to dynamically update new images as the viewpoint of the user's portable device is moved. Therefore, the systems and methods of the present disclosure are configured to keep track of the location of the selected cable even while the position of the camera changes or even while the cable are moved. For example, in some situations, it may be helpful for the user to move other cables out of the way if they block the view of the selected cable.

In some embodiments, a user can select equipment and then the cable-following application may be configured to retrieve information about cables that were previously identified. The application can then either show identification information about the cables on the display screen, which may be overlaid on the live image rendered by the portable device. The application can also point in the direction that the cables are directed on the live image. If the cable destination is not visible in the rendered image, the application may point the user to the destination where it is located using either an aerial view, see-through images, arrows, or other visual effects overlaid on the live image indicating where to position the portable device and/or which direction to orient the portable device.

The AR processes can help a worker dynamically track the path of a selected cable among multiple cables by highlighting the path of the selected cable on the display screen. The AR processes can distinguish the selected cable from among the other cables. For example, these processes may include line-crossing analysis on two-dimensional (2D) images. Also, the AR processes can dynamically track cable when the viewpoint and/or orientation of the image capture device changes and/or when the cables are moved. Thus, these processes may be configured to keep track of the selected cable path even if points along the cable are lost.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 is a block diagram illustrating an embodiment of a portable device 10 for visually tracing a selected cable from a bundle of cables using augmented reality. In the illustrated embodiment, the portable device 10 may be a digital computing device that generally includes a processing device 12, a memory device 14, Input/Output (I/O) interfaces 16, an external interface 18, and a database 20. It should be appreciated that FIG. 1 depicts the portable device 10 in a simplified manner, where some embodiments may include additional components and suitably configured processing logic to support known or conventional operating features. The components (i.e., 12, 14, 16, 18, 20) may be communicatively coupled via a local interface 22. The local interface 22 may include, for example, one or more buses or other wired or wireless connections. The local interface 22 may also include controllers, buffers, caches, drivers, repeaters, receivers, among other elements, to enable communication. Further, the local interface 22 may include address, control, and/or data connections to enable appropriate communications among the components 12, 14, 16, 18, 20.

According to some embodiments, the I/O interfaces 16 may include one or more image capture devices (e.g., cameras, video cameras, etc.) for capturing images of a plurality of cables in a bunch or bundle. Also, the I/O interfaces 16 may include one or more display devices, display screens, or other suitable output devices for visually depicting the captured images. Also, in accordance with the AR processes described in the present disclosure, the display devices or display screens of the portable device 10 may be configured to show additional visual features that may be generated by the AR processes to help highlight the selected cable with respect to the other (non-selected) cables in the real-world view.

The portable device 10 may include an augmented-reality cable-tracking program 24, which may be configured to utilize AR to track a selected cable along its path, even when the viewpoint of the captured image changes and the images are changed. The augmented-reality cable-tracking program 24 may be configured to automatically refresh the newly captured images on the display screen to provide substantially real-time feedback to the user. The augmented-reality cable-tracking program 24 may be implemented in software and/or firmware and stored in the memory device 14, as depicted in FIG. 1. In other embodiments, the augmented-reality cable-tracking program 24 may be implemented entirely or partially in hardware in the processing device 12.

According to some embodiments, the external interface 18 and databased 20 may be omitted from the portable device 10. For example, in these embodiments, the portable device 10 may be used as a stand-alone device for providing AR cable-following functionality for the user. However, in other embodiments, the external interface may be configured to communicate with external devices (e.g., via cellular signals, Wi-Fi, Bluetooth, etc.). Communication with external devices may be provide functionality to enable cable-following images to be provided to a remote device. For example, the portable device 10 may be used as a "gopher" device for capturing images, which can then be communicated to a remote device (e.g., a device associated with a network operator who may then analyze the images, provide instruction about directing the gopher, etc.).

It should be appreciated that the processing device 12, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 12 may also include or utilize stored program instructions (e.g., stored in hardware, software, and/or firmware) for control of the portable device 10 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 14 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 14 may incorporate electronic, magnetic, optical, and/or other types of storage media. The memory device 14 may have a distributed architecture, where various components are situated remotely from one another, but can be accessed by the processing device 12.

The memory device 14 may include a data store, database (e.g., database 20), or the like, for storing data. In one example, the data store may be located internal to the portable device 10 and may include, for example, an internal hard drive connected to the local interface 22 in the portable device 10. Additionally, in another embodiment, the data store may be located external to the portable device 10 and may include, for example, an external hard drive connected to the Input/Output (I/O) interfaces 16 (e.g., SCSI or USB connection). In a further embodiment, the data store may be connected to the portable device 10 through a network and may include, for example, a network attached file server.

Software stored in the memory device 14 may include one or more programs, each of which may include an ordered listing of executable instructions for implementing logical functions. The software in the memory device 14 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 12), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 12 or other suitable circuitry or logic). For example, when executed, the instructions may cause or enable the processing device 12 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., the processing device 12), or any suitable combination thereof. Software/firmware modules may reside in the memory device 14, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 16 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 16 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The external interface 18 may be used to enable the portable device 10 to communicate over a network, the Internet, a Wide Area Network (WAN), a Local Area Network (LAN), and the like. The external interface 18 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The external interface 18 may include address, control, and/or data connections to enable appropriate communications on a network.

Figure 2:
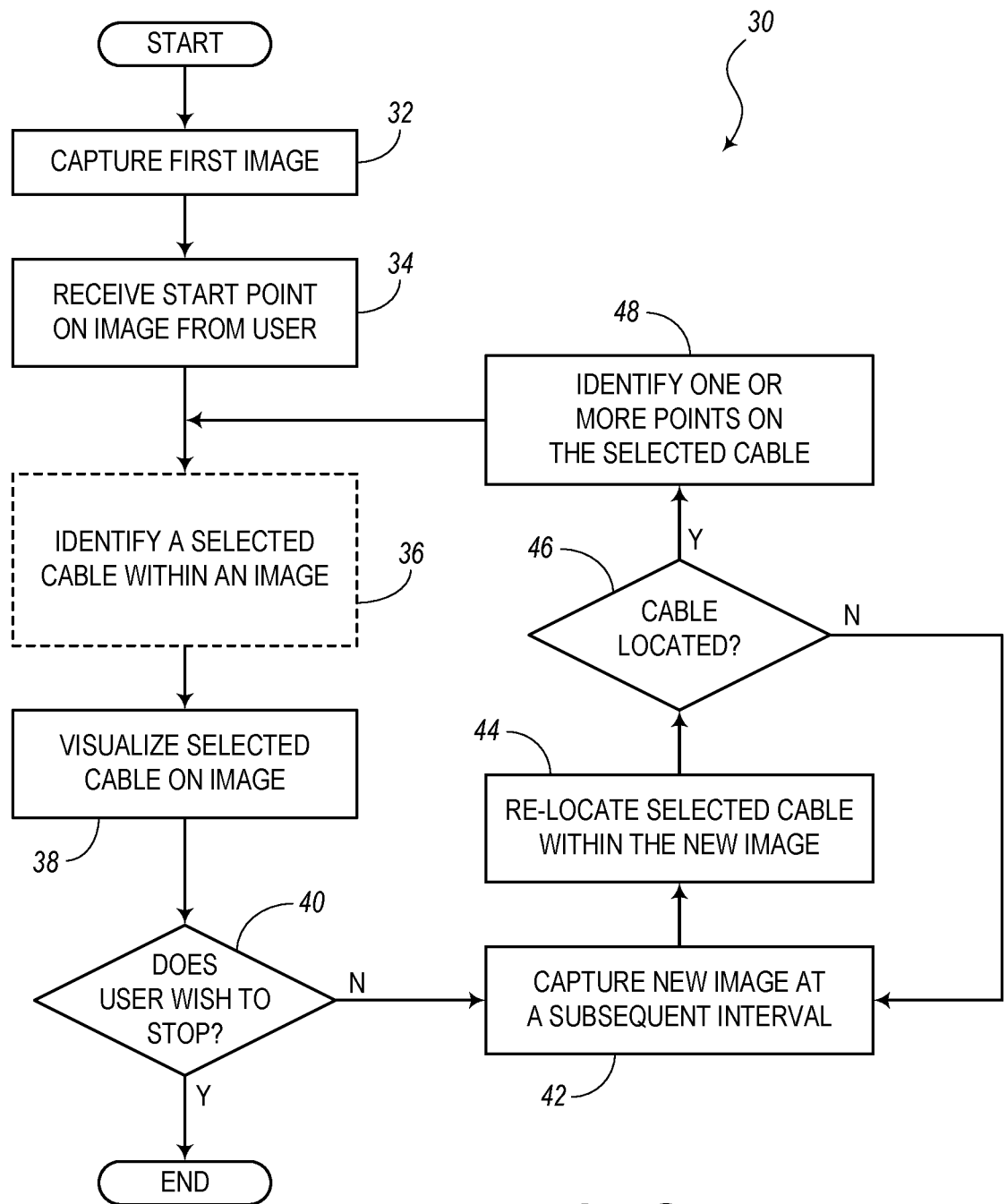
FIG. 2 is a flow diagram illustrating a first process for visually tracing a selected cable using augmented reality, according to various embodiments of the present disclosure.

FIG. 2 is a flow diagram illustrating a first embodiment of a process 30 for visually tracing a selected cable using augmented reality. In this embodiment, the process 30 include a first step of capturing a first image, as indicated in block 32. Capturing the image may include capturing a single image, capturing multiple images over a short time (e.g., video), allowing a user to utilize an image capture device (e.g., camera, video camera, etc.) to capture one or more images where one may be chosen as a representation of what the user may be trying to do.

The process 30 further includes receiving a start point on the image from a user, as indicated in block 34. From the image captured in block 32, the start point is selected by the user. This start point may preferably be a point clearly on one of the cables shown in the captured image and clearly visible in the frame of the image (i.e., not hidden from view). The process 30 also includes identifying a selected cable within the image, as indicated in block 36. This step (i.e., block 36) may include one or more various image processing steps for identifying the selected cable. Also, the image processing of block 36 is further described with respect to FIG. 5 below.

After processing the image to identify the selected cable (block 36), the process 30 includes the step of visualizing (i.e., displaying, depicting, representing, etc.) the selected cable on the image, as indicated in block 38. For example, this step may include adding augmented visual cues or other highlighting or emphasis-type features to display the selected cable in a different way with respect to the other cables in view in the image.

In this embodiment, the process 30 further include a condition diamond 40 for determining whether an indication has been received from the user indicating that the user wishes to stop. If the user wishes to stop, the process 30 comes to an end. Otherwise, if no "stop" indication has been received, the process 30 proceeds to block 42. As indicated in block 42, the process 30 includes capturing a new image at a subsequent interval of time. It may be desirable to be able to handle multiple images per second to allow a continuous transition from one image to the next. If the user moves the portable device (e.g., portable device 10) too quickly, for example, a discontinuity in sequential images may result in a loss of the virtual identification of the selected cable and may require resetting. Thus, the present disclosure is configured to process the images quickly to avoid such discontinuities, even when the viewpoint of the portable device changes significantly in a short amount of time. Also, the present disclosure is configured to recover a lost identification and instruct the user to return to a known viewpoint where one or more images (e.g., stored in the memory device 14 and/or database 20) can be retrieved and the process can be resumed.

After capturing the new (subsequent) image, the process 30 includes re-locating the selected cable within the new image, as indicated in block 44. As suggested above, this may include comparing the new image with a previous image and analyze the differences. Assuming that the differences are not too significant, the processing steps can determine one or more points (or at least a portion or section) of the selected cable from the previous view to re-locate the selected cable.

The process 30 includes a condition diamond 46 configured to determine whether or not the selected cable has been located. If not, the process 30 returns back to block 42 to repeat the capturing of a new image until the selected cable can be re-located. According to additional embodiments, if the step of locating or re-locating the selected cable cannot be successfully accomplished within a certain amount of time (e.g., 10 seconds), then the process 30 may produce an error message and terminate the program. However, if the selected cable is located, the process 30 moves on to block 48. As indicated in block 48, the process 30 includes the step of identifying one or more visible points on the selected cable. Once the identified cable is re-located on the new image, block 48 includes the step of selecting a point within its boundaries to serve as the start point of a new iteration of the cable identification process.

From the identity of the selected cable and one or more points on the cable, the process 30 is able to repeat the image processing step of block 36 and the visualization step of block 38 continuously in subsequent time intervals for multiple images over the course of the cable following procedure. This allows the user to select the cable and then follow the selected cable along its path. Even when the selected cable is partially hidden from view, the image processing steps (e.g., block 36) may be configured to continue to follow the cable and provide instructions to the user as needed. This can assist the user and can be done without the user trying to follow the path of the cable by himself or herself, even if the user were to lose focus, blink, etc.

The process 30 may include a cable follower algorithm, a cable identification algorithm, etc. and/or may be implemented in any combination of hardware, software, and/or firmware. For example, the process 30 can include at least part of the augmented-reality cable-tracking program 24 shown in FIG. 1.

The process 30 may be capable of capturing images at some specific time interval. The high-level tasks of the process 30 may be completed in a short delay for any given image to allow for the processing of multiple views per second. Thus, lower priority tasks may be simplified or skipped to allow for quicker processing. This will provide the most flexibility for visually representing images to a user with sufficient speed and clarity. Also, the process 30 may allow for any user interactions for subsequent steps to take place before capturing a next image.

Regarding block 44 of re-locating the selected cable within the new image, the present disclosure may rely on an augmented-reality library, which may be stored in the memory device 14 and/or database 20. Thus, the process 30 can provide the functionality of displaying the identified cable or return its coordinates on a newly taken image. In some embodiments, the augmented-reality libraries may include known AR vision, tracking, classes, etc. offered by various vendors.

Figure 3A:
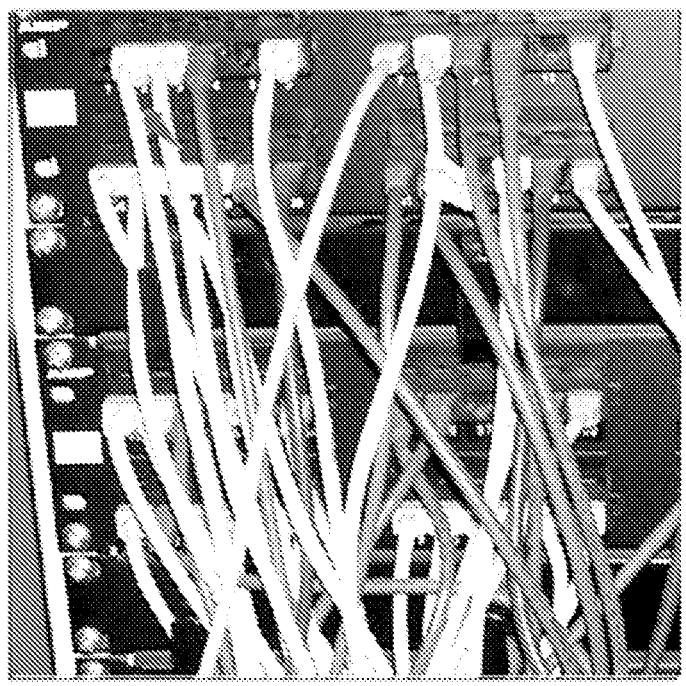
FIGS. 3A and 3B are images of cables and trace selection points related to the image capture and cable selection steps shown in FIG. 2, according to various embodiments.
Figure 3B:

FIG. 3A is a captured image 50 related to block 32 of the process 30 of FIG. 2. In particular, the captured image 50 may be captured as an initial image or first image that can be used to enable user-selection of a cable that the user wishes to follow or track. As shown in FIG. 3A, an arrow 52 or other suitable indication marker can be placed and/or moved on the screen by user input mechanisms (e.g., tapping or sliding motions on a display screen of a smart phone, etc.). The arrow 52 is indication of a start point related to block 34 shown in FIG. 2. FIG. 3B is another example of a captured image 54 and a user-entered start point arrow 56 of an initial image for allowing the user to select a cable from a bundle of cables, which could possibly be a tangled bunch of cables in a relatively small space. In these examples, a first ends of multiple cables are terminated at connectors on a back panel of network equipment, which may be present in a data center or other similar environment.

According to some embodiments, when the cable-tracking application (e.g., augmented-reality cable-tracking program 24) is first opened by a user of the portable device, a startup may run. The application may present a view to the user obtained from an associated image capture device on the portable device. The application may be configured to instruct the user to select a start point for cable identification of the selected cable. This start point (e.g., one of the points related to the arrows 52, 56) and the captured image (or a subsequent image) may then be passed to the application to between the cable identification processes.

FIGS. 4A-4E show examples of images of cables and visual highlighting features related to the cable visualization step (i.e., block 38) shown in FIG. 2. In this step, the selected cable is visualized to properly identify this selected cable on the respective image. The visually highlighted features are shown after performing the various image processing steps (e.g., block 36 and/or the processes of FIG. 5). Using the data related to the selected cable (e.g., coordinates, thickness, color, etc.) obtained from the image processing, the application is configured use image visualization techniques to correctly present the selected cable on the original image.

Figure 4A:
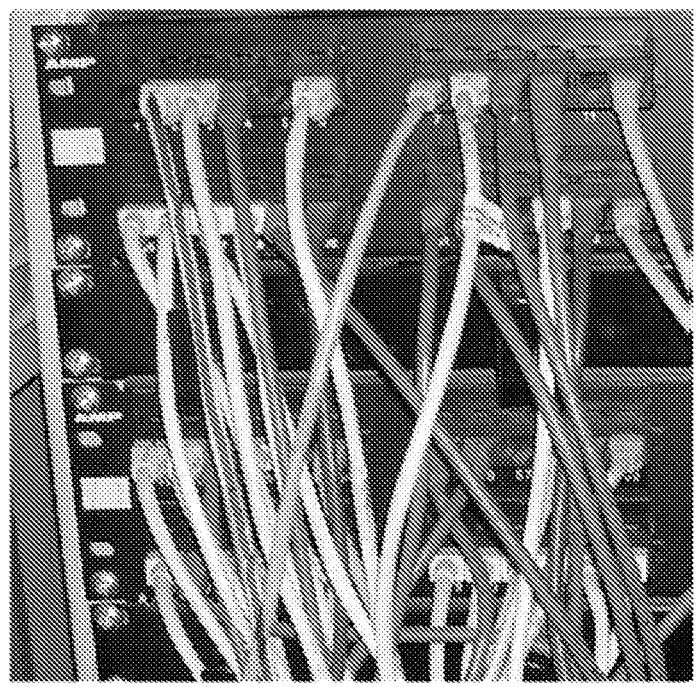
Figure 4B:
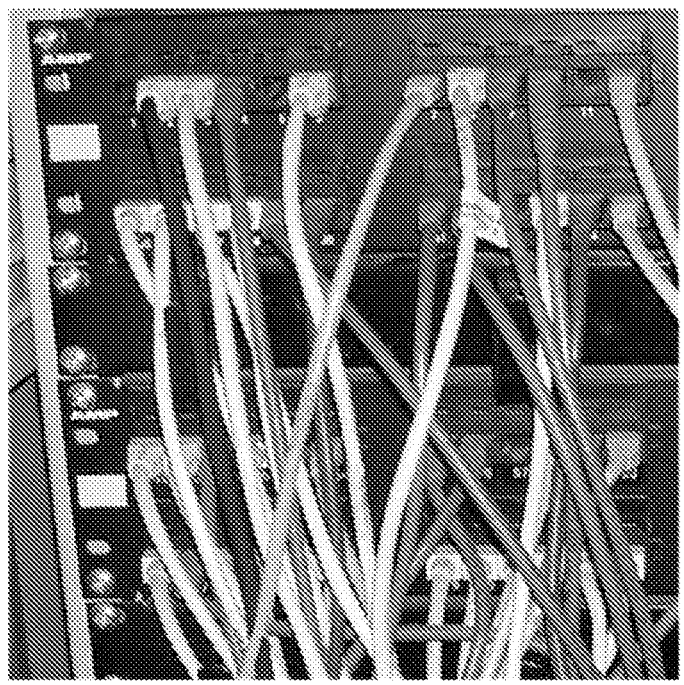

For example, FIGS. 4A and 4B show images 58, 60, respectively, which are related to different examples of highlighting features added to the captured image 50 shown in FIG. 3A for identifying a selected cable in a first group of cables. FIG. 4C shows image 62 related to an example of highlighting features added to the captured image 54 shown in FIG. 3B for identifying a selected cable in a second group of cables. FIG. 4D is a screen shot 64 that shows an example of the highlighting of FIG. 4C while running the cable-following application on a smart phone. FIG. 4E is a screen shot 66 that shows the captured image 54 of FIG. 3B with archived points related to previously determined termination locations of the second group of cables, while running the cable-following application on the smart phone.

In the simplest form, the highlighted features shown in FIGS. 4A-4E may include a process of stringing together a number of coordinates from one or more cable sections determined to be part of the selected cable. The highlighting feature may include drawing a line on the image. An alternative highlighting feature may include using new or pre-existing augmented-reality libraries (e.g., from one or more creators), which may be capable of emphasizing certain identified objects or other similar AR functionality.

The following use cases demonstrate hypothetical situations that may be resolved by using the systems and methods described with respect to the present disclosure. It should be noted that these use cases are provided for illustration purposes only to clarity the ideas and principles of the present disclosure and are not meant to be limiting.

Case 1: Rat-Nest Cleanup

A network technician, Information Technology (IT) engineer, or other network management or maintenance personnel may be assigned to reorganize a messy cable organization (also referred to as a "rat nest"). As a first step, the technician may need to identify the path of each cable. Instead of attempting to visually follow each cable individually and note their start point and end point on paper, he or she may decide to use the augmented-reality cable-tracking program 24 or other similar application on a portable device (e.g., a smart phone being used by the technician).

The technician starts the application and is able to see an environment displayed on a display screen of the portable device. In an initial view, the technician is able to use the application to first select a cable. The application may provide an instruction, such as "select a cable to follow," "identify cable," "cable identification mode" and/or may select an option or menu button from a menu of possible options. The technician can look at the equipment on the screen and select a cable (e.g., by touching a point on a portion of the cable on the screen, using mouse functions, joystick functions, etc.). The application performs the image processing to detect as much of the selected cable as possible and displays the selected cable (with the highlighting features) on the screen. As shown in FIGS. 4A-4E, the highlighting may include adding a specific color on top of the image of the selected cable that is a different color than the other cables. The technician may then move the portable device (e.g., smart phone) in the direction or path of the selected cable to track this cable, while the application is busy identifying the selected cable from one image to the next and continuously highlighting the cable.

Thus, the screen shot 64 of FIG. 4D may be a sample smartphone cable follower application. In some situations, the selected cable may not be visible at certain points where several cables cross. In this case, the technician may need to move those cable out of the way to allow the application to track the selected cable properly. If the application has difficulty identifying the cable when it gets lost behind other cables, the application may instruct the user to move the other cables as necessary to pick up the path of the selected cable again. The application can then display the progression of the cable.

In some cases, the technician may wish to follow a cable that goes through a tube from one room to another or from one floor to another. In this example, the technician may be instructed by the application to pause the tracking procedure and allow the technician to call a colleague in the other room or on the other floor. Using a linked portable device, the colleague may be able to visually identify the selected cable which may temporarily be out of view from any suitable viewpoint that the portable device could use. The two technicians in this case may then find the correct cable (e.g., by pushing/pulling the cable). Then, the second technician may start the same cable-tracking application (e.g., augmented-reality cable-tracking program 24) on his or her side to join the search. In some cases, the applications running on both devices may be configured to communicate with each other to share useful information to allow the continuance of the cable-tracking process. The application on the second portable device may also allow the second user to identify the selected cable as mentioned above with respect to the initial selection processes (e.g., allowing the user to touch the image of the selected cable on the display screen).

In other situations, a second technician may not be available to help the first technician when the first technician reaches a roadblock (e.g., cables running from one room and/or floor to another). In this case, the technician may be able to visually note a selected cable on an opposite side of a wall or floor, pause the application, and restart the application after going to the other room. The technician may touch a reset button on the application to start the select process again and continue the identification process.

When an end of the cable is identified (either at a start or an end of the cable-tracking process), the application may allow the user to enter a long key/button press on the selected cable displayed on the screen to confirm that the cable has been properly identified. Also, the application may give the user an option to label the selected cable or add other notes about the selected cable. In one example, the engineer may add notes of "GPON ONU A23 to PPP F56" or other notes, which can be stored in the application with respect to the cable. After completion, the cable is now identified and recorded.

The application may also be accessed using the portable device or other computer system. Then, with the recording of information with respect to multiple cables, the technician may be able view the cable information for use at a later time. In this manner, the technician can look at the equipment through the application and see what cables were identified and which ones were not. Once the relevant cables have been identified, later maintenance or cable replacement actions can be simplified with the known cable tracking information. As a result, the augmented-reality cable-tracking program 24 can simplify the tasks of the technician and can save the technician valuable time and frustration from having to follow cables with the AR assistance. Also, the augmented-reality cable-tracking program 24 can be used to reduce the number of human errors that can occur from manual cable tracking processes.

Again, the engineer selects one cable by touching it on the screen. Using augmented reality, the application adds highlighting features to the selected cable. While the engineer moves the camera or the cables in space, the application dynamically continues to recognize the cable and update the highlighting on the new images. The engineer can then follow the path of the cable with the smartphone.

If the cable passes behind one or more other cables, a line-crossing image processing algorithm (e.g., related to block 36 shown in FIG. 2) may be configured to recognize a continuity of the cable nonetheless. If the cable is invisible by the camera at some point along its path because it is hidden by other cables crossing its path, the engineer can move those cables and the application will be able to update the augmented reality to show the path now revealed.

From this data, the application may be configured to build a database of identified cables and their connections. Later on, in a "cable viewer" mode, the application may indicate on live images which cables were previously identified and which were not. The engineer can then look at the equipment (e.g., cables and connectors) through the application to see this information directly on screen. The application may also display the average time it took to identify the cables and a time estimate to cover the other cables that remain to be identified. This feature allows the engineer to better plan how many cables remain to be identified, their lengths, a time estimate for tracking, and a downtime plan to replace those cables in a cleaned and ordered configuration.

Case 2: Replace an Intermittent Defective Cable

In this next scenario, the cable tracking systems, methods, and applications of the present disclosure may be configured to assist a technician when a defective cable needs to be replaced. Using the present embodiments, a cable can be replaced with less down time than manual cable-tracking processes. Instead of using conventional strategies (e.g., recording cable connectivity information on paper notes), the network operator, technician, IT engineer, or other network or data center worker may decide to utilize the program/application described in the present disclosure. In some cases, the application can be used after the first set of procedures for originally tracking and maintaining cable connectivity information, which again can be assisted by the augmented-reality cable-tracking program 24 as described throughout the present disclosure for identifying and archiving one or more of the existing cables and connections.

The technician starts the application and selects the "Identification Archives" mode. For example, a screen (e.g., screen shot 66 of FIG. 4E) may be shown. The technician can see the cable bundle environment (e.g., using a camera or other image capture device of the portable device 10). In the "Identification Archives" mode, the application may provide menu buttons to allow the user to select different options. The application also shows the already identified cables and/or connectors. In FIG. 4E, the connectors (e.g., terminations, ports, etc.) for connecting to one end of the cables may be identified. The application may add distinct colors to the identified connectors.

The technician may select a cable or connector. In this example, the technician is provided options to select one of multiple connectors shown on the screen. Selection can be made by touching the screen on the connector or a marker (e.g., circle) representing the connector. The application may be configured to provide optional notes in a button-free message box (e.g., tips) over the selected cable, which may be useful for confirming that this connector is related to the target cable. A connector may be identified as a first end of the cable. Since the other end of the cable may not be visible on the screen at this first stage, the application may display an arrow to help the technician orient the portable device to find the cable's destination or path.

After the phone is properly oriented, the technician may see a blurred identification where the cable's end should be. This may be an intentional function of the application of the present disclosure to indicate that the cable end is not in a direct line of sight and may be hidden by other equipment or may run in to another room. Guided by the application, the technician may walk into another isle (e.g., of a data center) and find the end of the cable identified on the smartphone's screen. If there are transmission issues with the cable, the technician may propose a cable replacement to resolve the issues, even if both ends of the cable are properly connected and do not show visible damage. When removed, a new cable can be properly routed between both sets of equipment. Connection downtime to disconnect the old cable and reconnect the new can be reduced using this process (e.g., down to a few minutes). Thus, with the assistance of the augmented-reality cable-tracking program 24, the cable replacement process can be simplified for the technician. This can reduce human time and effort and provide more accurately in following a cable from one end to the other.

Figure 5:
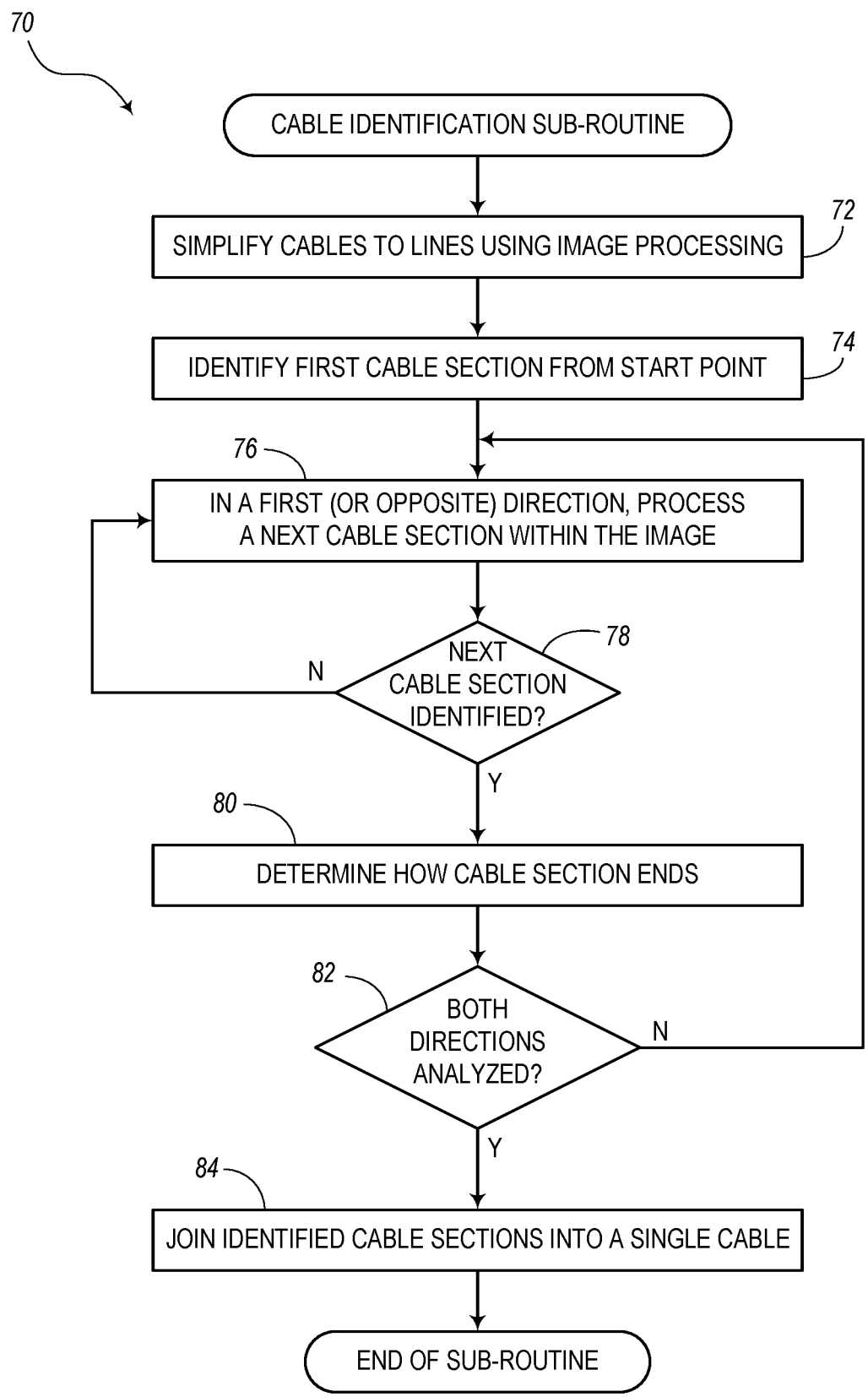
FIG. 5 is a flow diagram illustrating a cable identifying sub-routine of one of the steps of the process of FIG. 2, according to various embodiments.

FIG. 5 is a flow diagram illustrating an embodiment of a sub-routine 70 for identifying a cable. For example, the sub-routine 70 may be an image processing analysis routine and may represent all or part of block 36 shown in the process 30 of FIG. 2. The block 36 indicates the step of identifying a selected cable within an image (either the initial image or any subsequent images). The cable identification sub-routine 70 of FIG. 5 includes a first step of simplifying the cables shown in the image to "lines" (or line segments) using an image processing technique, as indicated in block 72. The sub-routine 70 further includes the step of identifying a first cable section from the start point (or other identified point) on the selected cable, as indicated in block 74.

The sub-routine 70 may be configured to proceed in one or both directions along the length of the selected cable. According to other embodiments where other types of objects are tracked whereby the objects may include more than two directions, the sub-routine 70 may repeat the following steps as needed to cover all applicable directions. However, for the sake of simplicity, the present disclosure is directed to the tracking of cables, which of course have a first end, a second end, and two different directions along the cable (toward the first end or toward the second end).

As indicated in block 76, the sub-routine 70 includes proceeding first in a first direction (from the start point) and processing a next cable section (in the first direction) within the image. For example, the first direction may be oriented "upward" along the view of the cable (e.g., shown closer to the top portion of the screen of the smart phone). When repeated a second time, the block 76 can indicate the processing in a second direction with respect to the start point to process a next cable section in the second direction. The second direction in this case may be a "downward" direction along the cable (e.g., toward a bottom portion of the screen of the smart phone).

The sub-routine 70 further includes the step of determining if the next cable section has been identified, as indicated in condition diamond 78. If not, the sub-routine 70 goes back to block 76 to process the next cable section. If this cable section is identified, the sub-routine 70 goes to block 80, which indicates the step of determining how the cable section ends. For example, it may be determined that a definitive end of the cable is shown in the view of the captured image. The end of the cable shown within the frame or view of the capture image a) may be a termination into a connector, b) may be a sliced cable end, c) may lead out of the frame and would need be recalculated as the portable device is moved in the direction of the point at which the cable leads out of the frame, or d) may be indeterminate between of too many cables or other objects blocking the view of the cable, and/or other possibilities.

If a single candidate cable section cannot be decisively identified using the above criteria, the block 80 of the sub-routine 70 may be configured to determine how the current cable section ends. The step of block 80, for example, may include determining if the cable is terminated, if it is plugged into a device, if it has been cut, etc. The end can be determined if the current cable section has no candidates in the determined ideal region. Also, the sub-routine 70 may determine if the image border has been reached. This occurs if the current cable section ends at any image border. It may also be determined that the view of the cable might be too chaotic, and the identification process might determine that multiple candidate cable sections may satisfy certain path following criteria.

Furthermore, the sub-routine 70 includes determining if both (or all) directions have been analyzed, as indicated in condition diamond 82. For example, if the first direction is upward, the sub-routine 70 may then progress in the opposite direction (e.g., downward). In other embodiments, a cable being followed may curve to a certain extent such that a first direction may be upward and an opposite direction may lead to the right side (or left side) of the screen. If it is determined in condition diamond 82 that both directions have not yet been analyzed, then the sub-routine 70 returns back to block 76 to process the next cable section for the opposite direction. After both directions have been analyzed, the sub-routine 70 includes the step of joining the identified cable sections into a single cable, as indicated in block 84, and then ends.

Figure 8:
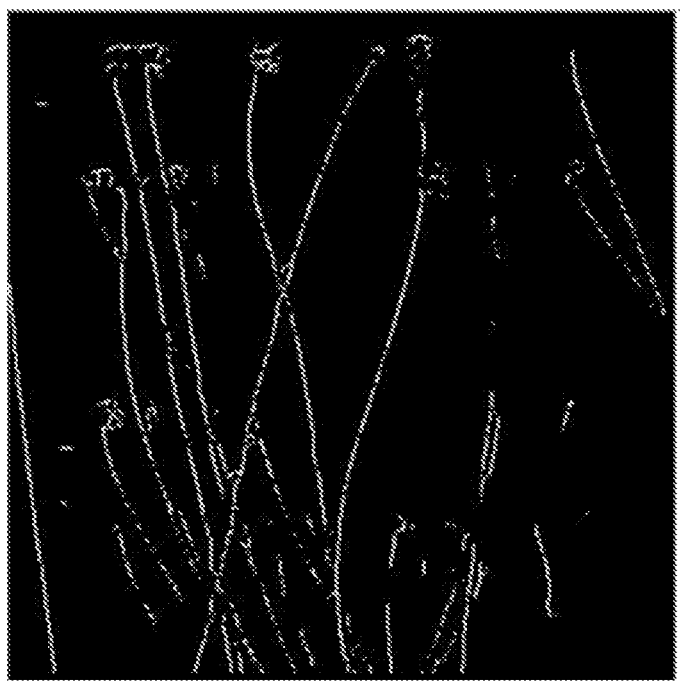
FIG. 8 is an image with respect to a skeletonization step of the sub-routine of FIG. 5, according to various embodiments.
Figure 9:
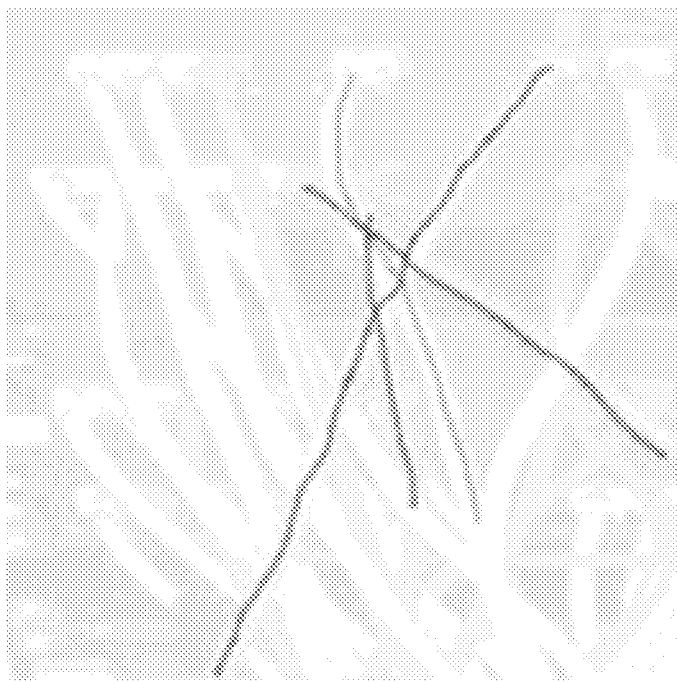
FIG. 9 is an image with respect to a corner detection step of the sub-routine of FIG. 5, according to various embodiments.
Figure 10:
FIG. 10 is an image with respect to line and point detection steps of the sub-routine of FIG. 5, according to various embodiments.

FIGS. 6-12 show images of the example of the captured image shown in FIG. 3A during image processing techniques according to various embodiments of the present disclosure. For example, certain image processing techniques with respect to the step of simplifying cables to lines (e.g., block 72 shown in the sub-routine 70 of FIG. 5) are illustrated in FIGS. 6-9. Certain image processing techniques with respect to the step of identifying the first cable section from the start point (e.g., block 74 shown in the sub-routine 70 of FIG. 5) are illustrated in FIG. 10. Also, identifying next cable sections (e.g., blocks 76 and 78) may be represented by FIG. 11. Joining cable sections (e.g., block 84) may be represented by FIG. 12.

Figure 6:
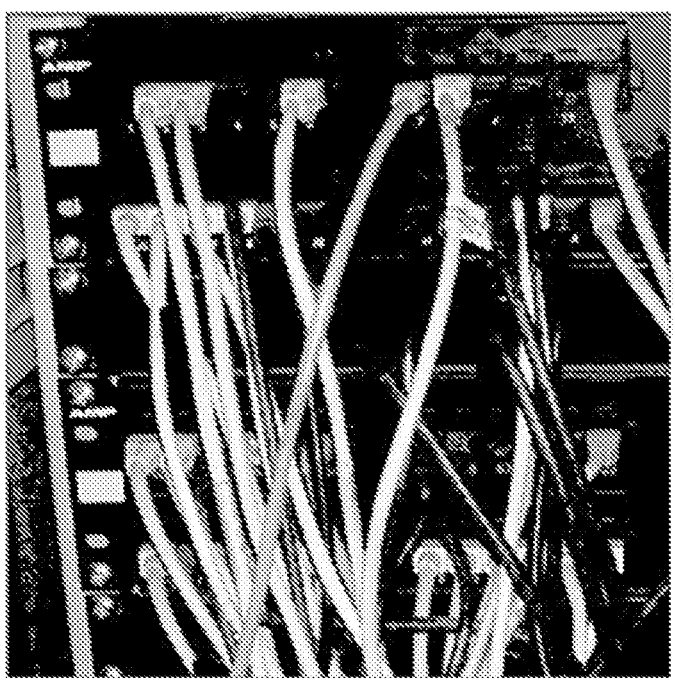
FIG. 6 is an image with respect to a color filtering step of the sub-routine of FIG. 5, according to various embodiments.

FIG. 6 is an image 90 showing an example of a color filtering step, which may be related to the step of simplifying cables to lines (e.g., block 72) of the sub-routine 70 of FIG. 5. The color filtering technique as shown in FIG. 6 may use any number of new or existing image-processing techniques to convert a captured image of cables into lines, which can be used to simplify the cable identification process. For example, color filtering may be configured to filter out cables from the image which are not in the color-range of the selected cable.

Figure 7:
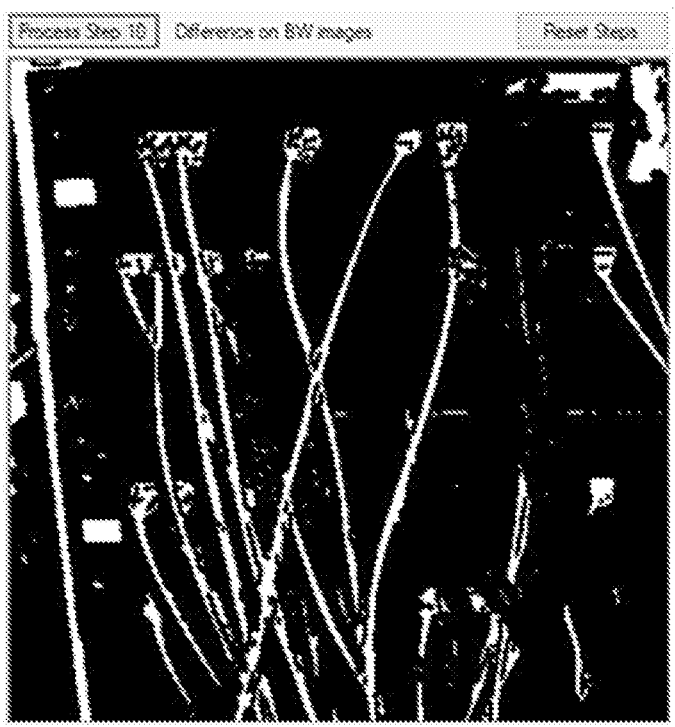
FIG. 7 is an image with respect to Canny-edge detection, dilation, and erosion steps of the sub-routine of FIG. 5, according to various embodiments.

FIG. 7 is an image 92 showing an example of Canny-edge detection, dilation, and erosion steps, which may be related to the step of simplifying cables to lines (e.g., block 72). The processes may include conversion of the image to black and white (or a grayscale conversion). This may be done to increase the efficiency of image-processing functionalities. The image processing may include Canny-edge detection and/or morphological processes (e.g., dilation process, erosion process, etc.). The process may convert overlapping cables as individual sections.

FIG. 8 is an image 94 showing an example of a skeletonization step, which may be related to the step of simplifying cables to lines (e.g., block 72) of the sub-routine 70 of FIG. 5. FIG. 9 is an image 96 showing an example of a corner deletion step related to the sub-routine 70. The skeletonization and corner deletion steps are configured to convert cable sections as individual lines.

FIG. 10 is an image 98 showing an example of line and point detection steps, which may be related to block 74 of the sub-routine 70 of FIG. 5. The image processing may include identifying a first cable section from a provided start point. As a first step, all cable sections are located. This can be done using new or existing image processing techniques (e.g., blob detection, etc.). Then, using the image coordinates of the user's selection, the image processing technique may include identifying the closest cable section via a simple comparison of points. In FIG. 10, located cable sections are represented by yellow lines & blue dots. The cable section selected by the user is shown in red.

Figure 11:
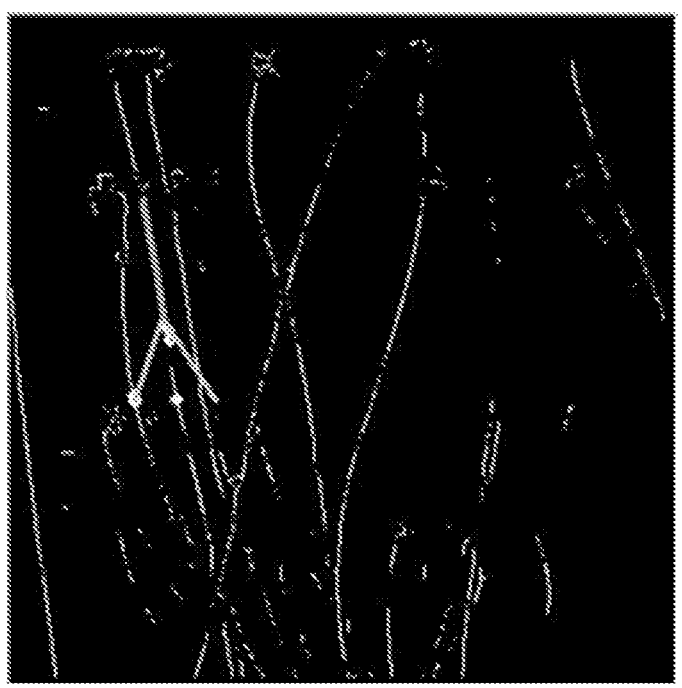
FIG. 11 is an image with respect to a cable section tracking step of the sub-routine of FIG. 5, according to various embodiments.

FIG. 11 is an image 100 showing an example of a cable section tracking step, which may be related to blocks 76, 78 of the sub-routine 70 of FIG. 5. The cable section tracking step may include identifying subsequent cable sections in one direction. For example, the image-processing technique as shown in the image 100 of FIG. 11 may be repeated for both cable directions. In may be noted that cable identification may be performed in both direction (e.g., upward and downward directions) to search for the next cable section. The description below is directed to only one direction (e.g., the downward direction) for the sake of brevity, but the same processes may be performed in the opposite direction as well to yield an identified cable to be visualized.

Identify the next cable section may include a first step of selecting, from the list of all located cable sections, a subset (e.g., the top 5) of sections that are closest in distance to the bottom edge of the original cable section. A second step may include defining an ideal region for the next cable section (e.g., a triangular shaped region extending downwards from the current cable section). To determine in which direction the triangle should extend, the following sub-steps may be taken:

- Take two points of the current cable section (e.g., one near the bottom, and one far enough towards the top to accurately determine a "slope");
- Compute a slope from these two points; and
- Assuming a triangular region is desired (other region shapes could also be used), define the region starting from the bottom edge of the current cable section and extend in the determined direction using positive and negative angles off the computed slope (e.g., 15 degrees off the slope).

The next step for identifying the next cable section may include selecting, from the list of the closest candidates, the one candidate that best satisfies the following criteria:

- The candidate falls within the ideal region defined above.
- The candidate's computed slope (using the same technique as above but starting from its top edge) must intersect with the current cable section's computed slope.
- The intersection angle between the two cable sections must be as close to 180 degrees as possible.

The image 100 of FIG. 10 depicts the current cable section in red, the center points of each candidate cable section as yellow dots, and the ideal region (triangular in shape) with blue lines. The image processing process then include repeating the above process steps for each subsequent cable section until no more sections can be identified.

Figure 12:
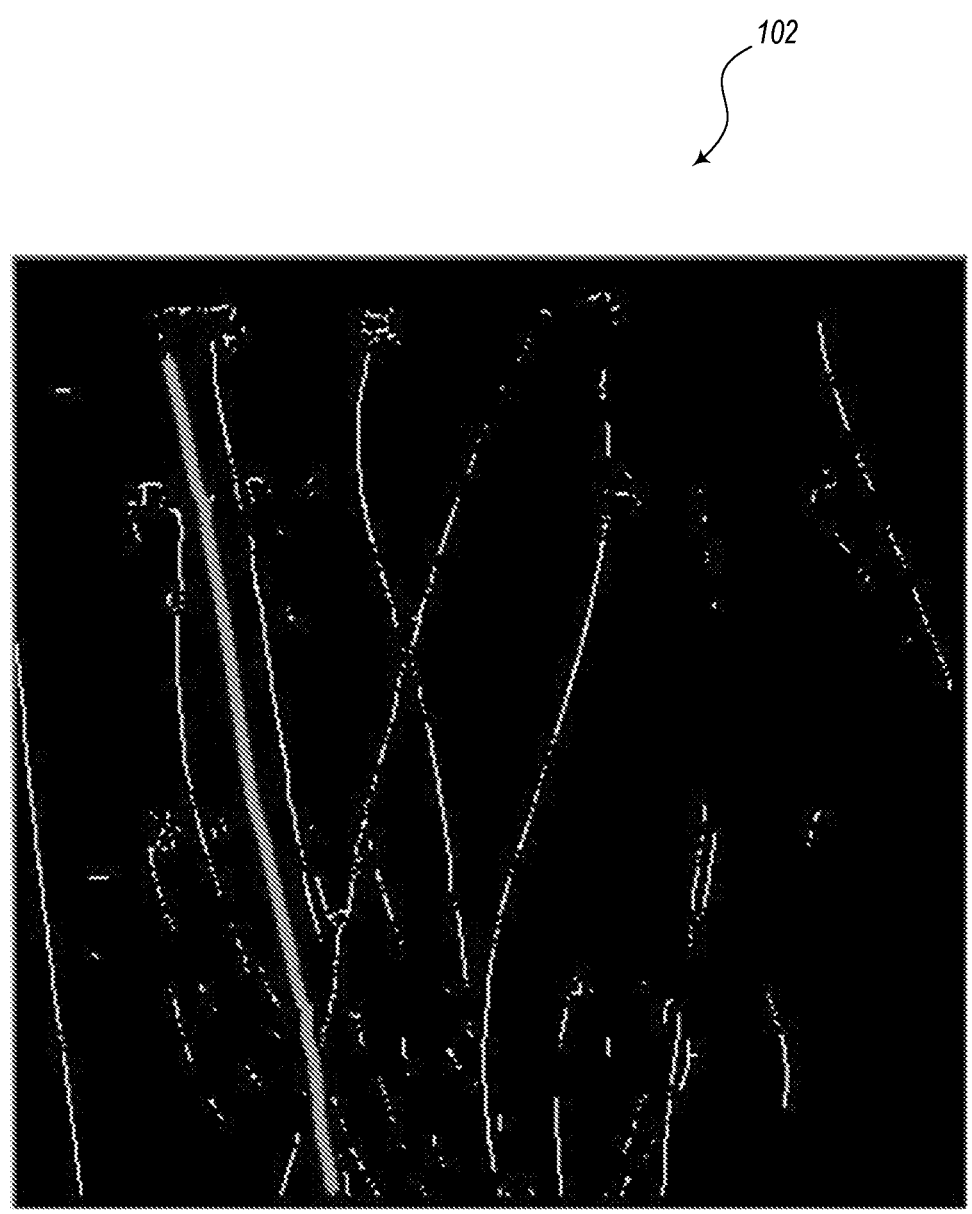
FIG. 12 is an image with respect to a cable section joining step of the sub-routine of FIG. 5, according to various embodiments.

FIG. 12 is an image 102 showing an example of a cable section joining step, which may be related to block 84 of the sub-routine 70 of FIG. 5. Once all cable sections have been identified in both directions, the process of joining the identified cable sections into a single cable may include combining the data (e.g., coordinates, thickness, color, etc.) of the cable sections into a single cable entity. This grouping allows for future cable-specific data to be associated to the cable entity later on (e.g., start connector, end connector, service provider info, etc.).

In addition to the various embodiments of the systems and methods for tracking a cable amidst a bunch of cables and identifying a selected cable from one view to a next, the present disclosure further includes alternative cable identification solutions, which may provide additional improvements. For example, a first change may include a process to restrict cable identification process to a focused region of each of the captured images. Therefore, the application can focus a region, which could either be provided by the user or estimated automatically from a simpler rough cable detection algorithm.

Another modification may include the use of a depth camera (or the use of many images from different vantage points) to build a 3D map of bundle of cables. The addition of depth analysis could improve the ability of the present systems and methods to handle cable bundles, knots, and other such complexities, which may be more difficult to model in 2D.

Also, another alternative solution may include detecting a cable using multiple tries, attempts, or iterations. This could be done using previously acquired images or by having the user manually moving cables and use the detected cable information from each image to improve the ability of the present systems and methods to handle cable bundles, knots, and other such complexities.

In addition, further improvements for the cable-tracking systems and methods of the present disclosure may include: a) adding cable masking techniques to the image processing stages, b) replacing the processing device 12 with a dedicated Graphical Processing Unit (GPU), which may be capable to faster and more efficient image processing techniques and may improve image and signal processing, and c) performing a higher degree of approximation to replace linear approximation processes to detect the next best candidate with higher approximation processes to yield a better estimate concerning curved cables.

An additional improvement may include forging all routes from an initial global picture. For example, before starting any cable identification, the application may invite the user to take one or several pictures to provide a global picture. This may help to pre-define routes and help discriminate the selected cable from others in a part of the picture where distinction is harder.

Also, another improvement may include preserving key information taken from the initial image (e.g., cable color, boundaries, etc.) to improve the later tasks of the cable identification process. For example, the image processing steps tend to remove details from the image as it advances. This improvement would seek to make those key details available to later tasks of the cable identification process.

Alternative cable identification methodologies may include the following alternative solutions to identify cables within an image. For example, cable identification may include the use of Machine Learning (ML). In this case, the application may define and train a ML model (or utilize a mode processed in advance) to handle the identification of cable sections. This may include continuously collecting identification data from users to update and re-train the model. This would allow all users to benefit from a ML model that evolves and improves over time.

Furthermore, the embodiments of the systems and methods of the present disclosure may also include complementary functions to improve usability, as described as follows. The additional functionality may include the ability to persist and quickly re-identify cables identified during previous sessions. The application may be configured with the ability to attach meta data to identified cables (e.g., source and target connector information, service provider information, etc.) and include the meta data in the identified cables persisted data. Other complementary functions may include organizing already identified cables by room and equipment. Also, the application may export persisted data for identified cables in multiple formats (e.g., raw data, pictures, spreadsheets, etc.).

The present embodiments may include other complementary functions, such as cloud-sharing of already identified cables between many users in real-time. Also, the application can superimpose visual cues on the image to help guide the user to the next step (e.g., help the user re-orient the device camera when a previously identified cable cannot be re-identified on the current image). The application may allow the user to pause the cable identification process to better understand what has been identified up to that point. Also, the application can alert the user if a previously identified cable can no longer be found on an image.

Figure 13:
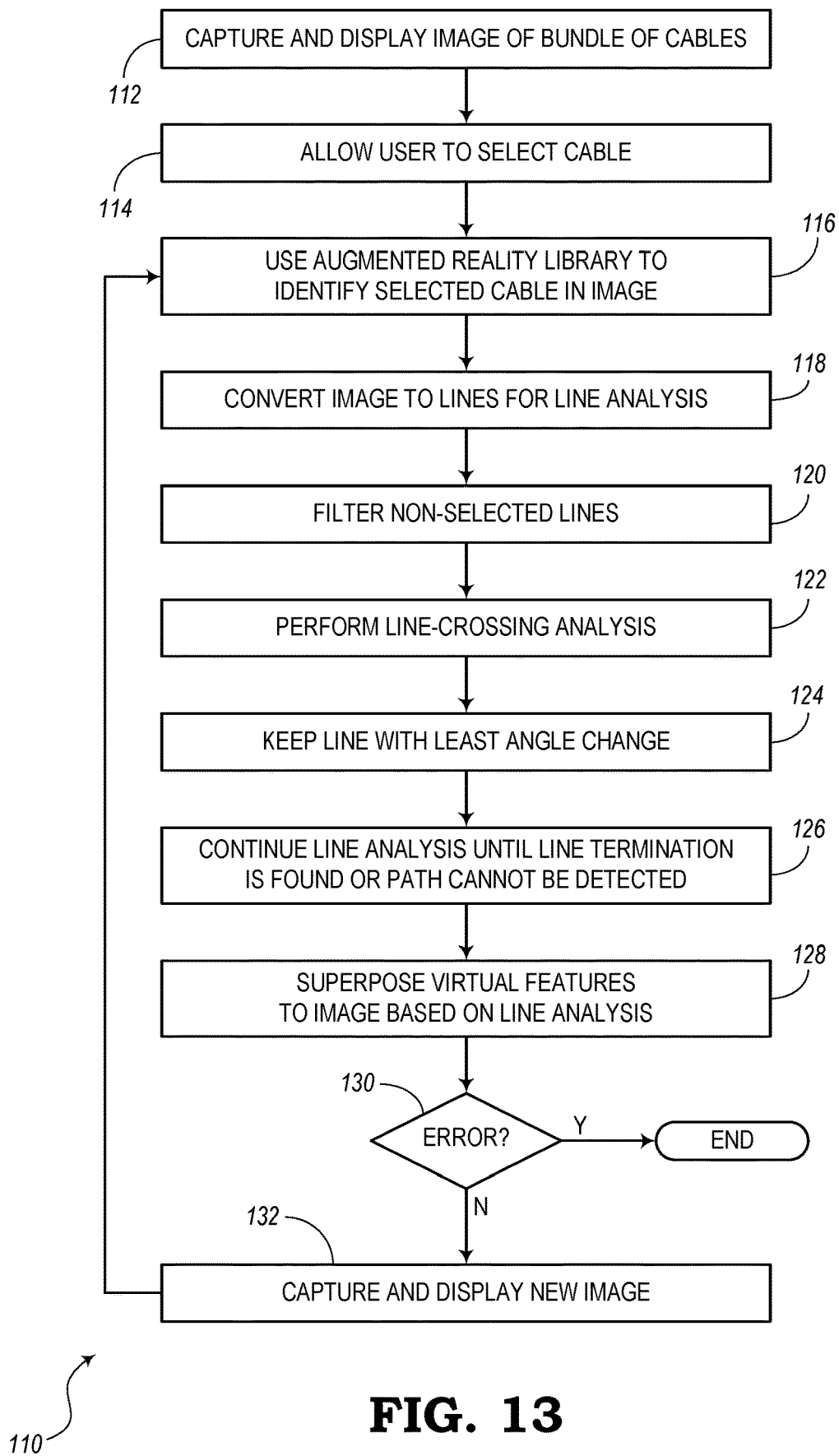
FIG. 13 is a flow diagram illustrating a second process for visually tracing a selected cable using augmented reality, according to various embodiments of the present disclosure.

FIG. 13 is a flow diagram illustrating an embodiment of another process 110 for visually tracing a selected cable using augmented reality. As illustrated in this embodiment, the process 110 includes capturing and displaying an image of a bundle of cables, as indicated in block 112. For example, the image captured by the camera may be rendered on a smart device. At this stage, no augmented reality feature is included to the rendered image if a cable has not yet been selected, if the cable or its intermediary position is out-of-sight, or if an error is detected during the analysis.

The process 110 also include allowing the user to select a cable, as indicated in block 114. The step may include waiting for a response from the user, wherein, upon the user selecting one cable (e.g., by clicking on the screen), the application moves to the next step. Also, the process 110 includes using an augmented reality library to identify a selected cable in the image, as indicated in block 116. The image may be processed in augmented reality to select the cable path on the point clicked by the user (i.e., the selected cable path corresponding to the selected cable). The selected cable start-up position may be stored as a 3D coordinate to be converted to 2D coordinates for the image analysis. These coordinates may also be provided by an augmented reality library. The 3D coordinates on the discovered cable path may be temporarily stored in order to allow to continue image analysis whenever the cable's start position becomes out-of-sight.

Furthermore, the process 110 also includes converting the image to lines for line analysis, as indicated in block 118. Also, the process 110 includes filtering out the non-selected lines as much as possible, as indicated in block 120. The image may be converted to lines defining cable paths and non-selected lines are filtered.

Then, the process 110 includes performing a line-crossing analysis to account for cables that cross paths within the particular viewpoint of the captured image, as indicated in block 122. The process 110 also includes the step of keeping a line that has the least amount of angle change (e.g., the straightest line), as indicated in block 124. In this step, line crossing analysis may be performed on a 2D line image without any deepness information. Line segments may be added to the selected cable path if it forms an angle within a predetermined scope (e.g., plus or minus 10 degrees) with the selected cable path.

In addition, the process 110 includes the step of continuing line analysis until a line termination is found or the path cannot be further detected, as indicated in block 126. If, at the end of the selected cable path, any lines are found within that predetermined angles (e.g., 10 degree margin), these lines can then be considered as possible line endpoint. Block 128 indicates a step of superposing virtual features to the image based on the line analysis. For example, this step may include adding color highlighting to the rendered image along the selected cable path to visually emphasize or identify the selected cable.

Also, the process 110 may include determining if an error is detected, as indicated with respect to condition diamond 130. Error detection may include determining if an error is detected after any or all of the steps described with respect to blocks 116, 118, 120, 122, 124, 126, 128. If an error was detected with respect to condition diamond 130, the process 110 ends. If no error is detected, the process 110 includes capturing and displaying a new image, as indicated in block 132, and looping back to block 116 to repeat the cable identification procedures as desired. Thus, the process 110 can be repeated in real time for each new image captured to provide a real time effect. If the user moves the cables, the process 110 continues to update the definition of the selected cable path in real time.

Some features of the systems and methods of the present disclosure may include using augmented reality to help a worker to dynamically follow the path of a selected cable among a rat nest of multiple cables by highlighting on a screen the path of the selected cable. The present embodiments may also be configured to distinguish the selected cable among a rat nest of cables using line-crossing analysis on the 2D image. The present disclosure also includes the feature of dynamically tracking a cable when camera orientation changes and cables are moved and keeping track of the cable path even if its original point is lost.

Figure 14:
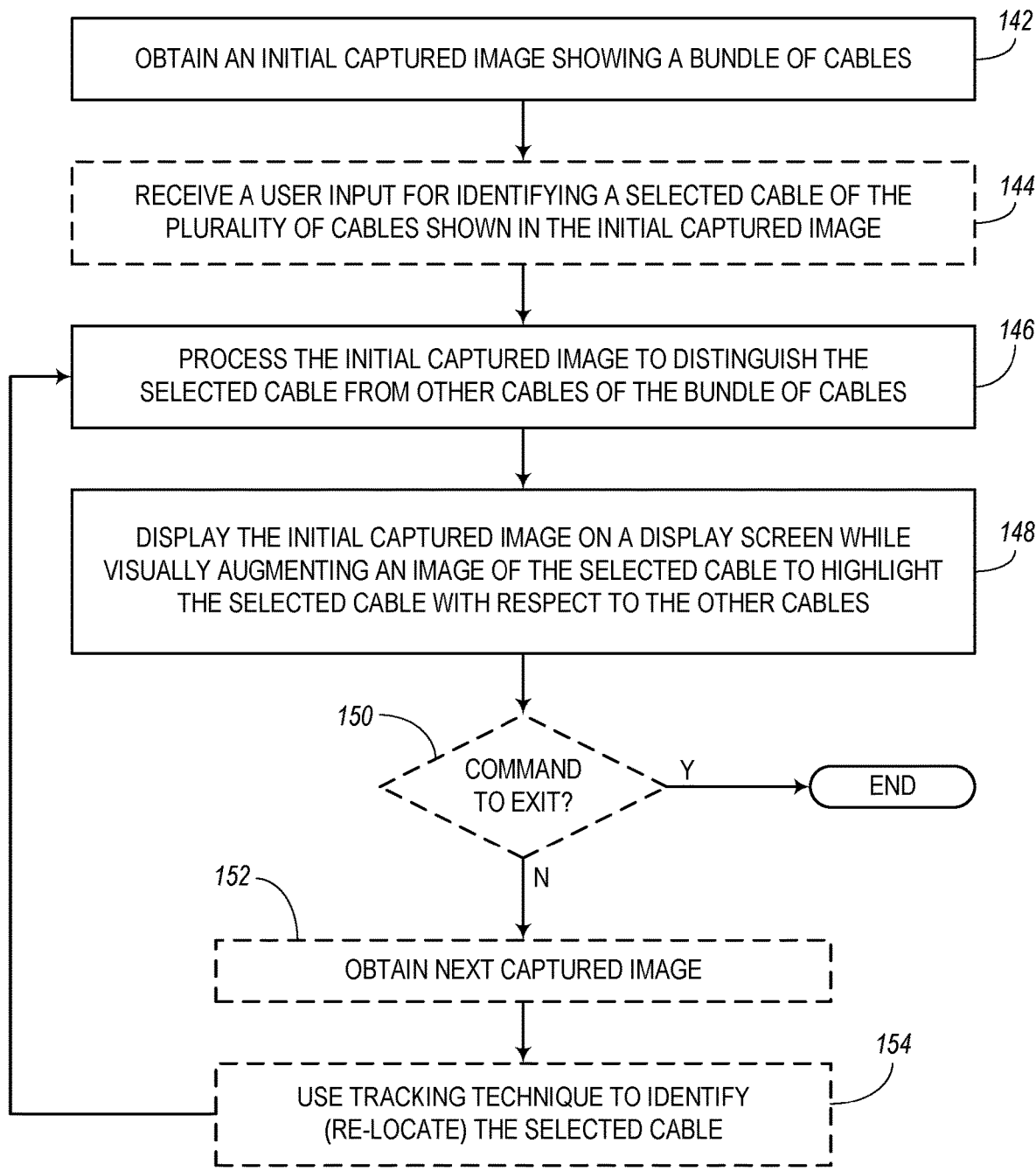
FIG. 14 is a flow diagram illustrating another process for visually tracing a selected cable using augmented reality, according to various embodiments of the present disclosure.

FIG. 14 is a flow diagram illustrating another embodiment of a process 140 for visually tracing a selected cable using augmented reality. The blocks shown with solid lines may be considered to be main features of the present disclosure, while the blocks shown with dashed lines may be considered to be extra features. The process 140 includes a first step of obtaining an initial captured image showing a bundle of cables, as indicated in block 142. In some embodiments, the process 140 may optionally include receiving a user input for identifying a selected cable of the plurality of cables shown in the initial captured image, as indicated in block 144. The process 140 also includes processing the initial captured image to distinguish the selected cable from other cables of the bundle of cables, as indicated in block 146. Also, the process 140 includes displaying the initial captured image on a display screen while visually augmenting an image of the selected cable to highlight the selected cable with respect to the other cables, as indicated in block 148.

According to some additional optional steps, the process 140 may further include determining whether or not a command is received (from the user) to exit the program, as indicated in condition diamond 150. If the user wishes to stop, the process 140 comes to an end. If no input is received to stop the process 140, a step of obtaining a next captured image is performed, as indicated in block 152. Then, the process 140 includes using a tracking technique to identify (re-locate) the selected cable to maintain continuity, as indicated in block 154. At this point, the process 140 loops back to block 146 to repeat the image processing functions and continuing the tracking of the selected cable.

In some embodiments, additional optional features may further include a process of freezing (pausing) image analysis. When the cable-tracking procedure can be resumed at a later time when the user places the portable device in the same or similar viewpoint as the place when the process was paused.

The systems and methods may also include the possibility of storing multiple cable configurations (e.g., for several server rooms, isles, or other areas within a predetermined space such as a data center, etc.). Also, the present embodiments may include cloud-sharing functionality (e.g., using the external interface 18) to share cable configurations among several user devices. In some cases, the shared information may be shared in real-time or a delayed sharing.

Also, the present disclosure may be configured to allow exportation of cable configurations in multiple formats (e.g., native data, pictures, spreadsheets, etc.). The present systems and methods may also distinguish on the user screen the identified cables from the non-identified ones. The present disclosure may also provide a time estimate to identify a cable and others.

One purpose or goal of the present disclosure may be to offer a tool to minimize downtime due to cable maintenance tasks. This can be improvement over manually following cables according to conventional processes. Some other objectives and technical advantages may include being able to properly detect a cable, even if it is interlaced or tangled up among other cables. Also, the present disclosure may be able to follow or relocate the detected cable among moving images or moving cables. Therefore, the present systems and methods may provide better than human precision and efficacy.

The solutions provided by the present disclosure may include systems, methods, non-transitory computer-readable media, applications, computer programs, portable devices (e.g., smart phones, tablet computers), computer systems, data capture and display systems, and other various systems. The various embodiments may include an application using augmented reality to identify and follow a designated cable. When a cable is selected, the program or application may be configured to perform a process of virtually distinguishing the selected cable from the others by adding colors, animations, or other computer-generated or AR features on the smart device rendered image.

If the cable destination is not visible on screen, the application may be configured to orient or direct the user towards the proper destination. Directing the user may include providing an aerial view, showing see-through images, displaying arrows on the screen, or other suitable instructional information.

In some embodiments, the AR techniques and algorithms described in the present disclosure may be developed as a software prototype or algorithm (e.g., the augmented-reality cable-tracking program 24). The program or application described in the present disclosure focuses mainly on the first part of identifying the cable in one image (i.e., the first or initial image). However, it should be noted that the additional subsequent images may be rendered in a similar manner using the various steps for each image. Thus, the display screen may show a current viewpoint or position as the portable device is moved in a continuous manner. The screen is refreshed with subsequent images accordingly.

As described above, the process 30 may be capable of capturing images at some specific time interval. Also, there is a need to implement the process 30 in real-time or in pseudo-real-time. As described herein, pseudo-real-time means a user perceives real-time execution. Based on experimentation, it was determined that the process 30 should process about 30 images per second or about one image every 33 milliseconds.

Additionally, users typically tolerate an upfront latency before displaying the first image. This latency could be used to perform the algorithm steps that would not need to be re-performed for each captured image. Using a parallel processing strategy, like a pipeline, could drastically minimize the latency between displayed images. An acceptable upfront latency is typically defined as less than 300 milliseconds (ms).

Based on experimentation, a prototype was developed that provided the following numbers:

| Step | Delay, in mS | Step Description |
|---|---|---|
| 1 | 1 | Load image, Color filtering |
| 2 | 6 | Black and White Conversion |
| 3 | 55 | Canny edge, Dilation, Erosion |
| 4 | 13 | Image preparation, Skeletonization |
| 5 | 67 | Corner detection |
| 6 | 44 | Cable detection algorithm |
| 7 | 3 | Complete process and report results |
| Total | 189 ms | |

To display an image every 33 ms with a 190 ms process, the algorithm would need to be broken into a parallel pipeline of 6 steps.

Several optimizations were proposed herein. Specifically consider the "Restrict cable identification process to a focused region of the image" suggestion and assume that the image analysis and processing could be limited to a ¼ of the original image. One could then roughly estimate the total processing time would decrease to 142/4+44/2+3=61 ms. At that speed, a simpler parallel pipeline of only 2 or 3 steps would be enough to provide a perceived real-time user experience.

The above measurements and example optimization demonstrate that a perceived real-time user experience is achievable with this algorithm. Even without optimization, the algorithm could use the described parallel processing pipeline strategy to display images at 33 ms with an upfront latency of 189 ms, lower than the suggested 300 ms upper limit. If we consider the optimization to limit the processing to a region of interest, we could go as low as 61 ms latency, giving us a margin for lower pipeline, better latency, lower processing power or less memory requirements.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. An Augmented Reality (AR) method comprising the steps of:
    obtaining an initial captured image showing a bundle of cables;
    processing the initial captured image to distinguish a selected cable from other cables of the bundle of cables using a tracking technique, including a line-crossing analysis, to identify sections of the selected cable among the bundle of cables and keep track of the selected cable even when points along the selected cable are lost within the initial captured image, the line-crossing analysis including adding line segments to a path of the selected cable in response to the line segments forming an angle with the path that is within a predetermined angle;
    displaying the initial captured image on a display screen while visually augmenting an image of the selected cable to highlight the selected cable with respect to the other cables;
    determining an end of the selected cable is missing from the initial captured image; and
    displaying an orientation marker responsive to determining that the end of the selected cable is missing from the initial captured image.

2. The AR method of claim 1, further comprising the steps of:
    receiving a next captured image after processing the initial captured image;
    comparing the next captured image with the initial captured image;
    using the tracking technique to identify at least a section of the selected cable among the bundle of cables in the next captured image;
    distinguishing the selected cable shown in the next captured image from the other cables;
    updating the display screen to display the next captured image while visually augmenting a next image of the selected cable to highlight the selected cable with respect to the other cables;
    repeating the receiving, comparing, using, distinguishing, and updating steps one or more times relative to a most recently processed captured image until one of a line termination is found and the path cannot be further detected, and in response to the path that cannot be further detected, identifying any lines within the predetermined angle to be considered as a possible endpoint.

3. The AR method of claim 2, wherein comparing the next captured image with the initial captured image includes determining differences between the next captured image and the initial captured image when an image capture device captures the next captured image and the initial captured image from different viewpoints or when the at least one cable of the bundle of cables is moved.

4. The AR method of claim 1, wherein the processing technique further includes at least one procedure selected from an object recognition procedure, a point detection procedure, a color filtering procedure, a Canny-edge detection procedure, a morphological procedure, a dilation operation, an erosion operation, a skeletonization procedure, and a corner deletion procedure.

5. The AR method of claim 1, wherein processing the initial captured image includes tracking each cable of the bundle of cables.

6. The AR method of claim 1, wherein processing the initial captured image includes identifying depth information for each cable of the bundle of cables and mapping each cable of the bundle of cables in a three-dimensional map responsive to the identified depth information.

7. The AR method of claim 1, wherein obtaining the initial captured image includes receiving the initial captured image from a camera of a portable user device, the display screen being associated with the portable user device.

8. The AR method of claim 7, wherein the portable user device is one of a smart phone, a tablet, eyewear, and a head-up display.

9. The AR method of claim 1, further comprising the step of receiving a user input for identifying the selected cable of the bundle of cables.

10. The AR method of claim 1, wherein visually augmenting the image of the selected cable includes the step of superposing virtual image features on the image of the selected cable.

11. The AR method of claim 10, wherein superposing virtual image features includes the step of adding color or animation features to the image of the selected cable.

12. The AR method of claim 11, wherein visually augmenting the image of the selected cable further includes displaying one or more visual features for showing portions of the selected cable that are hidden from view.

13. The AR method of claim 11, further comprising the step of using machine learning to distinguish the selected cable from the other cables.

14. A portable computing system comprising:
an image capture device,
a display screen,
a processing device, and
a memory device configured to store a computer program having instructions that, when executed, enable the processing device to
obtain an initial captured image showing a bundle of cables from the image capture device,
process the initial captured image to distinguish a selected cable from other cables of the bundle of cables using a tracking technique, including a line-crossing analysis, to identify sections of the selected cable among the bundle of cables and keep track of the selected cable even when points along the selected cable are lost within the initial captured image, the line-crossing analysis including adding line segments to a path of the selected cable in response to the line segments forming an angle with the path that is within a predetermined angle,
cause the display screen to display the initial captured image while visually augmenting an image of the selected cable to highlight the selected cable with respect to the other cables;
determine an end of the selected cable is missing from the initial captured image; and
cause the display screen to display an orientation marker responsive to determining that the end of the selected cable is missing from the initial captured image.

15. The portable computing system of claim 14, wherein the portable computing system is one of a smart phone, a tablet, eyewear, and a head-up display.

16. The portable computing system of claim 14, wherein visually augmenting the image of the selected cable includes superposing virtual image features on the image of the selected cable, wherein superposing virtual image features includes adding color or animation features to the image of the selected cable, and wherein visually augmenting the image of the selected cable further includes displaying one or more visual features for showing portions of the selected cable that are hidden from view.

17. A non-transitory computer-readable medium configured to store computer logic having instructions that, when executed, cause one or more processing devices to:
obtain an initial captured image showing a bundle of cables;
process the initial captured image to distinguish a selected cable from other cables of the bundle of cables using, a tracking technique including a line-crossing analysis, to identify sections of the selected cable among the bundle of cables and keep track of the selected cable even when points along the selected cable are lost within the initial captured image, the line-crossing analysis including adding line segments to a path of the selected cable in response to the line segments forming an angle with the path that is within a predetermined angle;
display the initial captured image on a display screen while visually augmenting an image of the selected cable to highlight the selected cable with respect to the other cables
determine an end of the selected cable is missing from the initial captured image; and
display an orientation marker on the display screen responsive to determining that the end of the selected cable is missing from the initial captured image.

18. The non-transitory computer-readable medium of claim 17, wherein the instructions further cause the one or more processing device to:
receive a next captured image after processing the initial captured image;
compare the next captured image with the initial captured image;
use the tracking technique to identify at least a section of the selected cable among the bundle of cables in the next captured image;
distinguish the selected cable shown in the next captured image from the other cables;
update the display screen to display the next captured image while visually augmenting a next image of the selected cable to highlight the selected cable with respect to the other cables;
repeat the receiving, comparing, using, distinguishing, and updating one or more times relative to a most recently processed captured image until one of a line termination is found and the path cannot be further detected, and in response to the path that cannot be further detected, identifying any lines within the predetermined angle to be considered as a possible endpoint.

19. The non-transitory computer-readable medium of claim 18,
wherein comparing the next captured image with the initial captured image includes determining differences between the next captured image and the initial captured image when an image capture device captures the next captured image and initial captured image from different viewpoints or when the at least one cable of the bundle of cables is moved.

20. The non-transitory computer-readable medium of claim 17,
wherein the processing technique further includes at least one procedure selected from an object recognition procedure, a point detection procedure, a color filtering procedure, a Canny-edge detection procedure, a morphological procedure, a dilation operation, an erosion operation, a skeletonization procedure, and a corner deletion procedure.

* * * * *